(12) United States Patent
Koch et al.

(10) Patent No.: US 6,668,884 B2
(45) Date of Patent: Dec. 30, 2003

(54) COMBINATION PNEUMATIC TIRE AND MONITORING DEVICE

(75) Inventors: Russell W. Koch, Hartville, OH (US); Paul B. Wilson, Tallmadge, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 152 days.

(21) Appl. No.: 09/923,504

(22) Filed: Aug. 7, 2001

(65) Prior Publication Data

US 2001/0045250 A1 Nov. 29, 2001

Related U.S. Application Data

(62) Division of application No. 09/206,042, filed on Dec. 4, 1998, now Pat. No. 6,309,494.

(51) Int. Cl.[7] .............................................. B60C 19/00
(52) U.S. Cl. .................................................. 152/152.1
(58) Field of Search ........................ 152/152.1; 340/442

(56) References Cited

U.S. PATENT DOCUMENTS

| | | | | |
|---|---|---|---|---|
| 4,765,852 A | * | 8/1988 | Koch et al. ................ | 156/97 |
| 5,300,164 A | * | 4/1994 | DeTrano et al. ............ | 156/116 |
| 5,462,617 A | * | 10/1995 | Bender et al. .............. | 156/96 |
| 5,573,611 A | * | 11/1996 | Koch et al. ................ | 152/152.1 |
| 5,960,844 A | * | 10/1999 | Hamaya ..................... | 152/152.1 |

* cited by examiner

Primary Examiner—Michael W. Ball
Assistant Examiner—John T. Haran
(74) Attorney, Agent, or Firm—Michael Sand; Michael R. Huber

(57) ABSTRACT

An attachment between a monitoring device and an innerliner of a tire includes the use of an epoxy adhesive that bonds the monitoring device directly to the inner surface of the innerliner of the tire. The innerliner is first roughened in a manner that provides a roughened portion of the innerliner without removing the entire thickness of the innerliner. The entire thickness of the innerliner is not removed because the innerliner is preferably more than $\frac{1}{16}$ of an inch thick. The thickness of the innerliner allows the rigid cured epoxy to bond the monitoring device to the inner surface of the innerliner while allowing the innerliner to flex with the tire so as to not break the seal between the rigid epoxy and the innerliner. The monitoring device is preferably located at a low flex area of the tire to help avoid the problem of the innerliner flexing.

19 Claims, 2 Drawing Sheets

COMBINATION PNEUMATIC TIRE AND MONITORING DEVICE

CROSS-REFERENCE TO RELATED APPLICATION

This application is a divisional application of Ser. No. 09/206,042 filed Dec. 4, 1998; is now U.S. Pat. No. 6,309,494; the disclosures of which are incorporated herein by reference.

BACKGROUND OF THE INVENTION

1. Technical Field

The present invention relates generally to pneumatic tires and devices that are adhered to pneumatic tires to monitor the conditions of the tires. More particularly, the present invention is related to the connection of the monitoring device to the tire. Specifically, the present invention relates to the method of attaching and the attachment of a monitoring device to the inner surface of a pneumatic tire using a surface preparation and an adhesive.

2. Background Information

It is desired in the art to monitor the conditions of tires while they are installed and in use on a particular vehicle. It is particularly desirable to measure tire wear, internal temperature, and internal pressure. Other desirable measurements may be the number of tire rotations that have occurred in given time. These measurements are preferably capable of being taken while the tire is in use without having to remove the tire from the vehicle or otherwise interrupt the use of the vehicle to take the measurements. It is particularly desirable to monitor the conditions and statistics on large off-the-road truck tires because the off-the-road tires are expensive and subject to harsher conditions than typical passenger car tires. The off-the-road tires on large trucks and other vehicles also must be regularly maintained to maximize vehicle efficiency. It is also desirable to monitor the tires of certain on road trucks and buses.

Numerous types of such monitoring devices are known in the art. One type of known monitoring device uses a passive integrated circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,500,065, 5,573,610, 5,562,787, and 5,573,611 which are assigned to the assignee of the present application.

One problem common to each of these monitoring devices is the problem of attaching the monitoring device to the tire. The attachment problem is difficult when the monitoring device is attached to the inside surface of the tire, the outside surface of the tire, or imbedded within the body of the tire. The attachment problem is difficult because the forces on the electronic device are significant and numerous. Tires not only are subjected to rotational forces when the vehicle is moving but also are subjected to various impact forces when the tire contacts bumps or surface irregularities. The attachment of the monitoring device to the tire must be strong enough and secure enough to maintain the position of the monitoring device with respect to the tire while experiencing all of these forces while also protecting the monitoring device from damage resulting from these forces.

Another problem with the attachment of a monitoring device to a tire is that the tire must be balanced about its rotational axis to efficiently perform. The monitoring device itself already adds weight to the tire that may require the tire to be counterbalanced. It is thus desired to minimize the weight of the attachment so that additional counterbalancing weights do not have to be added to the tire. It is thus desired to provide an attachment that is strong and secure while being small and lightweight.

Another problem experienced with attaching a monitoring device to a pneumatic tire is that the surface where the monitoring device is being anchored is often not stable. Tires are designed to flex and stretch to accommodate various pressures and forces. The attachment of the monitoring device to the tire must accommodate the movement and stretching of the tire surface where the monitoring device is connected. Such accommodation must last throughout the life of the tire and function at a wide range of temperatures and pressures. In the patents listed above, the monitoring devices are held in a pocket that is formed with a piece of material connected to the innerliner of the tire. Although these pockets function for their intended purposes, the construction of the pockets increases the counterbalancing problem and increase the complexity of the assembly steps.

A further problem experienced in connecting a monitoring device to a pneumatic tire is that tires are manufactured on automated assembly lines. The attachment method must be able to be relatively easily engineered into the existing automated tire assembly lines to be useful. As such, the method of attaching the monitoring device to the pneumatic tire should minimize any manual steps or steps that require precise component manipulation.

BRIEF SUMMARY OF THE INVENTION

In view of the foregoing, it is an objective of the present invention to provide an attachment that may be used to connect a monitoring device to the inner surface of a pneumatic tire that overcomes each of the problems experienced in the art.

Another objective of the present invention is to provide an attachment that maintains the connection between the monitoring device and the tire when the tire experiences predictable rotational and shock forces.

Still another objective of the present invention is to provide an attachment for connecting a monitoring device to a pneumatic tire that is lightweight so that the tire does not have to be excessively counterbalanced.

Yet another objective of the present invention is to provide an attachment for connecting a monitoring device to the interior of a pneumatic tire that accommodates the stretching and movement of the inner surface of the pneumatic tire.

A further objective of the present invention is to provide a method for attaching a monitoring device to the interior surface of a pneumatic tire that is easy to perform and may be performed by automated machinery in a tire manufacturing line.

A further objective of the present invention is to provide a method for attaching a monitoring device to the inner surface of a pneumatic tire that may be used at a variety of locations inside the pneumatic tire.

A further objective of the present invention is to provide a method for attaching a monitoring device to the inner surface of a pneumatic tire that does not require additional structural elements to be inserted into the tire or attached to the tire to secure the monitoring device.

An additional objective of the present invention is to provide an attachment and method for attaching a monitoring device to the interior surface of a pneumatic tire that is of simple construction, that achieves the stated objectives in a simple, effective, and inexpensive manner, that solves the problems, and that satisfies the needs existing in the art.

These and other objectives and advantages of the present invention are achieved by an attachment that includes an adhesive characterized by high viscosity at room temperature and capable of curing at 100° C. and lower, the adhesive adhering a monitoring device to the innerliner of a pneumatic article where the innerliner is at least 0.06 inch thick.

Other objectives of the present invention are achieved by a method for adhering a monitoring device to a tire including the steps of selecting a portion of the innerliner of the tire where the monitoring device will be connected; roughening the selected portion of the innerliner; applying an adhesive to at least one of the monitoring device and roughened portion; placing a monitoring device on the roughened portion of the innerliner; and curing the adhesive.

BRIEF DESCRIPTION OF THE SEVERAL VIEWS OF THE DRAWINGS

The preferred embodiment of the invention, illustrative of the best mode in which Applicants contemplated applying the principles of the invention, is set forth in the following description and is shown in the drawings and is particularly and distinctly pointed out and set forth in the appended claims.

Similar numbers refer to similar elements throughout the specification.

DETAILED DESCRIPTION OF THE INVENTION

Figure 1:
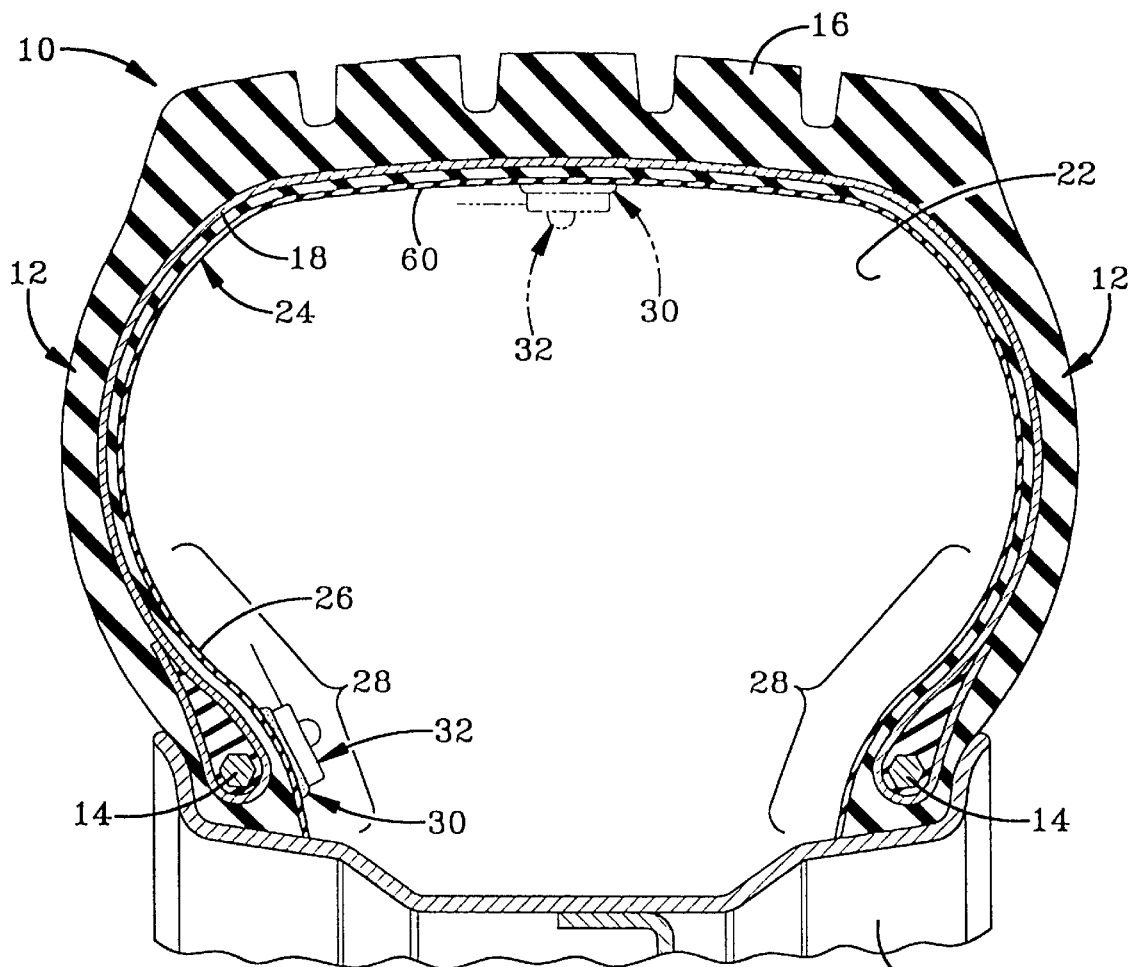
FIG. 1 is a sectional view of a pneumatic tire with a monitoring device attached to the innerliner of the pneumatic tire by the method of the present invention.
Figure 4:
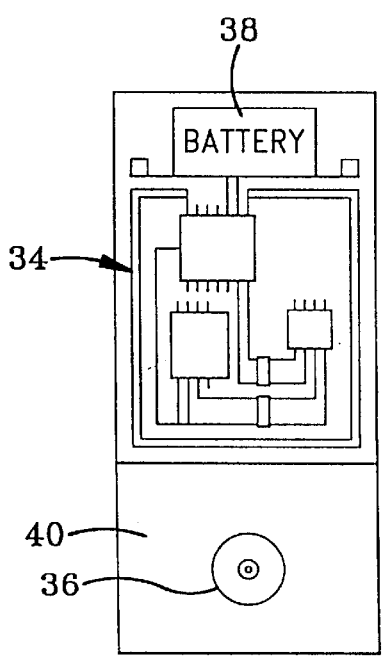
FIG. 4 is a plan view of an unencapsulated monitoring device.

A pneumatic article in the nature of a vehicle tire is depicted in the drawings and is indicated generally by the numeral 10. Tire 10 is of known construction and includes a pair of sidewalls 12 which extend outwardly from a pair of bead rings 14. A tread package 16 is located at the outer ends of sidewalls 12. Tire 10 further includes a plurality of cords or belts 18 that provide structural strength to tire 10. Tire 10 is supported on a rim 20 in a manner that provides an inner chamber 22 between tire 10 and rim 20. Inner chamber 22 is filled with pressurized air when tire 10 is in use to allow tire 10 to support the weight of the vehicle on which tire 10 is used. The pressurized air in chamber 22 is maintained in tire 10 by an innerliner 24 that is substantially impervious to air. Innerliner 24 is of known construction and includes not only butyl rubber but also chloro-butyl rubber, bromo-butyl rubber, and combinations thereof with up to less than 50% natural rubber. It is known in the tire building art that it is difficult to bond to innerliner 24.

The body of tire 10 is formed from a flexible and somewhat compliant rubber that flexes and stretches when tire 10 is in use. The movement of tire 10 is also transferred to innerliner 24 complicating the problem of bonding an article to the inner surface 26 of innerliner 24. The structure of tire 10 results in areas of tire 10 that flex more than other areas of tire 10. The areas that flex the least are the areas closest to rim 20. These areas are the low flex areas 28 that extend approximately 25% up sidewalls 12 and in some tire 10 configurations extends up to 50% of the height of sidewall 12. In most tire 10 configurations, low flex area 28 is 25% of the height of sidewalls 12.

It is also known in the art that innerliner 24 is formed in different thicknesses for different tires 10. The thickest innerliners 24 are used on off-the-road tires that are used with large vehicles. The thickness of off-the-road innerliners 24 are typically greater than at least 0.06 inch and are frequently greater than ¼ of an inch. Many truck and bus radial tires have innerliners greater than at least 0.06 inch whereas most passenger tires have an innerliner 24 that is less than 0.06 inch thick.

An objective of the present invention is to provide an attachment 30 that may be used to connect a monitoring device 32 to innerliner 24 of tire 10 in a manner that securely holds monitoring device 32 in position when tire 10 is used throughout the life of tire 10. Monitoring device 32 may be any of a variety of monitoring devices known in the art. In the embodiment of the invention depicted in the drawings, monitoring device 32 is an active electronic monitoring device that includes a microprocessor 34, a pressure sensor 36, and a battery 38 such as shown and described in U.S. Pat. Nos. 5,562,787, 5,573,611, 5,500,065, and 5,573,610, the contents of which are incorporated herein by reference. Each of these elements may be supported on a board or substrate 40 and connected to an antenna 42. It is desired in the art to encapsulate monitoring device 32 in a structurally stable housing 44 that may be a substantially rigid epoxy. Monitoring device 32 includes a bottom surface 46 that is used to bond monitoring device 32 to inner surface 26 of innerliner 24.

In accordance with another objective of the present invention, the method of attaching monitoring device 32 to innerliner 24 includes the following steps. A location on innerliner 24 in low flex area 28 is first selected to connect monitoring device 32. The selected location is first roughened to provide a roughened surface 50 that will accept the adhesive used in the present invention. This roughening may be performed by a buffing tool such as a tungsten carbide tool, sand blasting or by a variety of other known tools. Inner surface 26 of innerliner 24 is roughened by removing about 1 mil of material but preferably about 2 mils to remove the cure skin of innerliner 24 that is formed when tire 10 is cured. Roughened area 50 is then cleaned with an innerliner cleaner or a rubber cleaner such as cleaner fluid order no. 16-480 supplied by Patch Rubber Company a division of Myers Industries, Akron, Ohio. The cleaner may also be any degreasing solvent such as a 1, 1,2-trichloroethylene or heptane.

Roughened area 50 is then primed with a positive chlorine compound such as any chlorinated primer. A 3% trichlorotriazinetrione solution in butyl acetate is preferred.

Generally, any conventional rubber primer known to the art and to the literature can be utilized. Heretofore, typically chlorine or chlorine-containing compounds have been utilized to prime rubber. That is, a halogen or preferably a chlorine donor compound is utilized. A preferred rubber primer of the present invention is trichlorotriazinetrione which can be applied to the rubber as by brushing, spraying, etc., desirably in a multiplicity of coats. For example, a 3 percent trichlorotriazinetione solution in butyl acetate can be applied in a plurality of coatings such as three, allowing several minutes, e.g., 5 minutes drying time between coatings. Immediately after application of the last coating, its surface can be wiped off with RYMPLECLOTH® to remove by-products such as oils which migrate to the surface. The rubber surface can then be allowed to dry at ambient temperature for about 10 to 15 minutes.

Other rubber primers include the various N-halohydantoins, the various N-haloamides, the various N-haloimides, and combinations thereof. Examples of various desirable N-halohydantoins include 1,3-dichloro-5,5-dimethyl hydantoin; 1,3-dibromo-5,5-dimethyl hydantoin; 1,3-dichloro-5-methyl-5-isobutyl hydantoin; and 1,3-dichloro-5-methyl-5-hexyl hydantoin. Examples of N-haloamides include N-bromoacetamide and tetrachloroglycoluril. Examples of N-haloimides include N-bromosuccinimide and the various chloro substituted s-triazinetriones, commonly known as mono-, di-, and trichloroisocyanuric acid. The various mono-, di-, or trichloroisocyanuric acids, or combinations thereof are a preferred rubber primer with trichloroisocyanuric acid being especially preferred. A three percent by weight trichloroisocyanuric acid solution in butyl acetate is available from Lord Corporation as Chemlok 7707.

The various N-halohydantoins, N-haloamides, and N-haloimide rubber primers usually exist in solid form. They are readily soluble in polar solvent such as acetone and can be applied in liquid form. Application of these rubber primers generally occur at ambient temperatures. Application can be in any conventional manner as through brushing, spraying, and the like. A typical amount of the N-halohydantoins, N-haloamides, and N-haloimide primer in the solvent, for example, ethyl acetate or acetone, is generally from about 0.1 to about 10 percent by weight based upon the total weight of said rubber primer and solvent, and preferably is from about 0.5 percent to about 5 percent. Of course, higher or lower concentrations can be utilized. This solvent system has been found to dry within a matter of minutes so that the adhesive can be applied shortly thereafter. It is thought that the rubber primer adds halogen groups, for example, chlorine to the cured rubber bead which activates the surface thereof, allowing the adhesive to adhere strongly to the cured rubber surface. Still additional rubber primers include various acetamides such as chloroacetamide, bromoacetamide, iodoacetamide, and the like. The thickness of the rubber primer layer can vary greatly and often is thin since it reacts with the rubber.

The primer 48 is allowed to dry thoroughly on area 50 before monitoring device 32 is bonded to innerliner 24. Bottom surface 46 of monitoring device 32 is then degreased using acetone on a purified cheesecloth such as RYMPLECLOTH® brand, sold by American Fiber and Finishing, Inc. of Westford, Mass., and may also be textured to increase its surface area and ability to bond.

Monitoring device 32 is then bonded to area 50 using a suitable adhesive 52. A preferred adhesive 52 is an epoxy adhesive such as the FUSOR® 310B/320 adhesive that is available from Lord Corporation of Cary, N.C. Adhesive 52 is generally characterized as having a high viscosity at room temperature and capable of curing at temperatures of 100° C. or lower. Adhesive 52 generally consists of essentially epoxy and amine having a ratio of 2.5 parts epoxy to one part amine curative. Adhesive 52 may be spread on bottom surface 46 and area 50. Monitoring device 32 is then placed on area 50 with sufficient pressure to squeeze excess adhesive 52 out from under monitoring device 32. The excess adhesive 52 is removed and monitoring device is held in place by a suitable device such as a clamp or a piece of tape (not shown). Monitoring device 32 is held in place and adhesive 52 is allowed to cure for 16 to 24 hours. When a faster cure is desired, heat can be applied to decrease the cure period. Adhesive 52 is substantially rigid when it cures.

Figure 5:
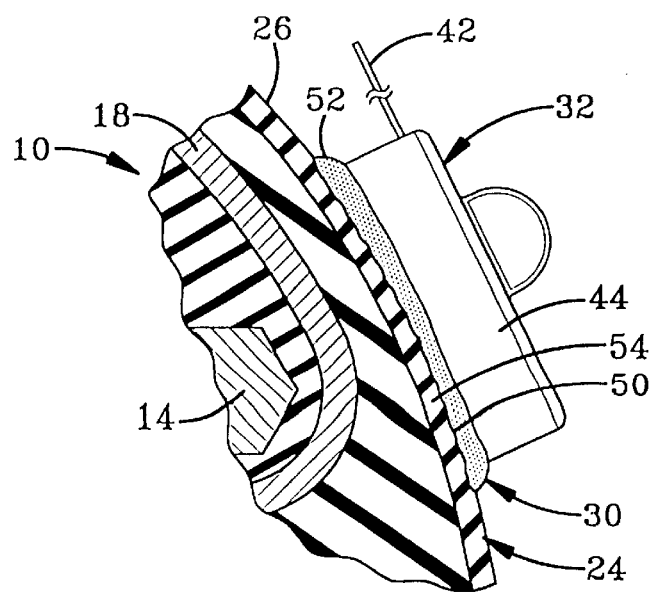
FIG. 5 is an enlarged sectional view similar to FIG. 1 showing an encapsulated monitoring device attached to the innerliner of a pneumatic tire.
Figure 2:
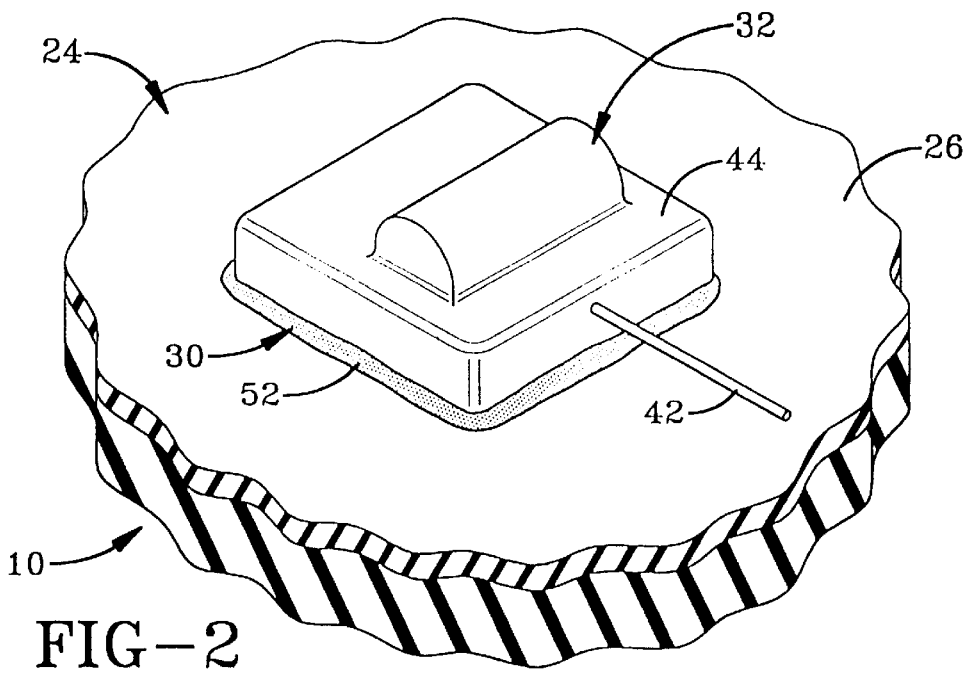
FIG. 2 is a perspective view of a monitoring device attached to the innerliner of the pneumatic tire by the method of the present invention.
Figure 3:
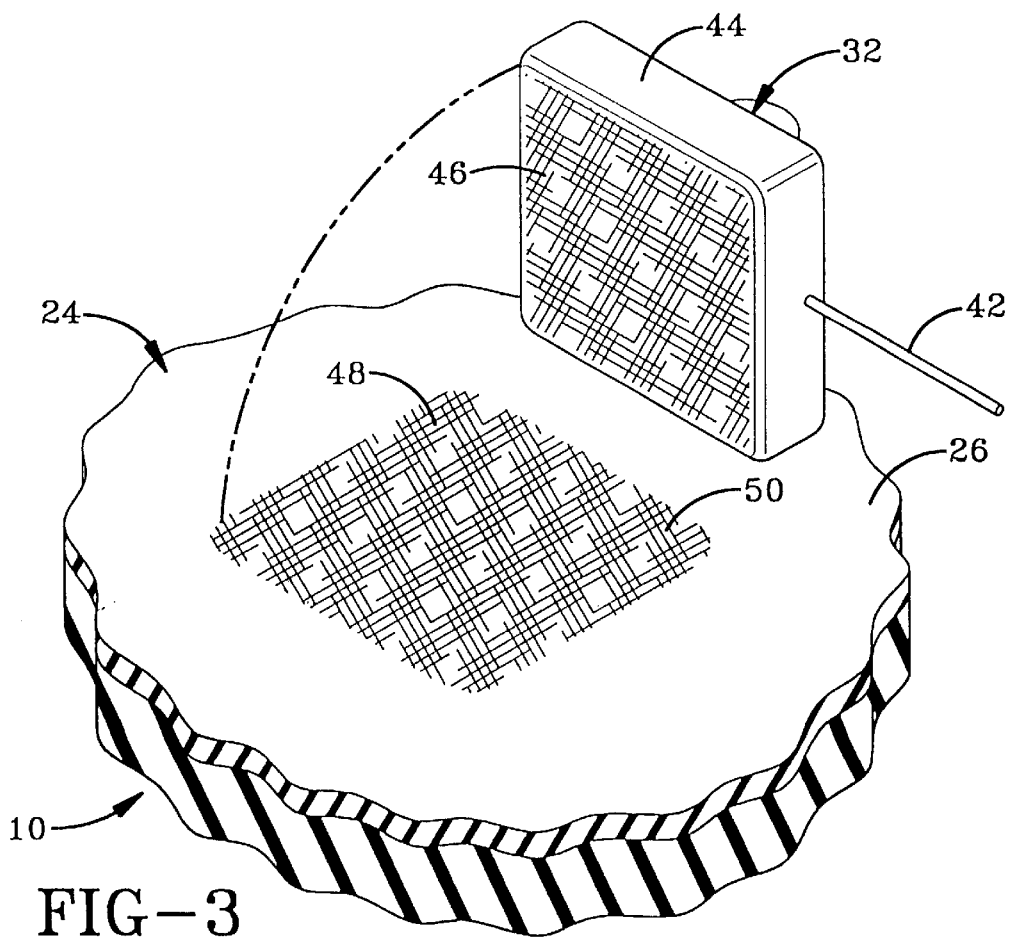
FIG. 3 is a perspective view of the monitoring device lifted away from the innerliner to show the treatment of the innerliner and the monitoring device according to the concepts of the present invention.

Rigid cured adhesives are not generally compatible with areas of tire 10 that move and flex when tire 10 is used. The above adhesive attachment system functions best when innerliner 24 is thick enough to allow inner surface 26 thereof to form a rigid bond with adhesive 52. Innerliners 24 on off-the-road tires 10 and on many truck and bus tires are typically thick enough to allow attachment 30 to properly function. The rigid bond is not disturbed or broken when tire 10 and innerliner 24 flex as a result of forces on tire 10 because of the thickness of innerliner 24. As can be perhaps best seen in FIG. 5, a significant portion 54 of innerliner 24 remains intact between roughened portion 50 and the body of tired 10. Innerliner portion 54 flexes with tire 10 and functions as a buffer that accommodates the flexing and movement of tire 10 without breaking the bond between adhesive 52 and innerliner 24. This accommodation is possible because innerliner 24 is thick in off-the-road and on certain truck and bus tires 10. When the thickness of portion 54 of innerliner 24 is decreased, the flex and movement of the body of tire 10 have a better chance of breaking the rigid adhesive 52 that connects monitoring device 32 to innerliner 24. When attachment 30 of the present invention is used on innerliner 24 of an off-the-road or truck and bus tires, innerliner portion 54 flexes enough throughout the life of tire 10 to prevent the bond between adhesive 52 and innerliner 24 from breaking throughout the life of tire 10.

Attachment 30 may also be used to connect monitoring device 32 to a different location on tire 10 such as the top surface 60 of tire 10 as depicted in the dashed lines shown in FIG. 1. A monitoring device 32 may be attached to top surface 60 when the configuration of tire 10 results in top portion 60 having low flex properties.

Attachment 30 thus achieves the objectives of the present invention by providing a lightweight attachment that securely attaches monitoring device 32 to innerliner 24 throughout the life of tire 10. Tire 10 thus does not have to be excessively counterbalanced because attachment 30 is lightweight. Attachment 30 may also be easily created by automated equipment on an existing automated tire manufacturing line because attachment 30 does not require additional structural elements to be added to tire 10 or monitoring device 32 such as the flaps of the prior art that cover monitoring device 32 to hold monitoring device 32 in a pocket. Likewise, attachment 30 further does not require monitoring device 32 to be embedded within the body of tire 10.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. In combination, a pneumatic article and a monitoring device mounted to the pneumatic article; the combination comprising:

a pneumatic article having an inner chamber, the inner chamber being lined with an innerliner; said innerliner being at least about 0.06 inch thick;

a monitoring device having a bottom surface;

an adhesive compatible with the surface of the innerliner and the bottom surface of the monitoring device, the adhesive capable of curing at 100° C. and lower, said adhesive adhering said monitoring device to the innerliner of the pneumatic article: the adhesive being rigid when the adhesive is cured.

2. The combination of claim 1 wherein the pneumatic article is an off-the-road, truck or bus tire.

3. The combination of claim 2 wherein the adhesive is an amine-cured epoxy.

4. The combination of claim 3 wherein the adhesive includes epoxy and amine curative having a ratio of 2.5 parts epoxy to one part amine curative.

5. The combination of claim 1 wherein the monitoring device is encapsulated with an epoxy to provide an encapsulated monitoring device having a bottom surface, said bottom surface being adhered to the innerliner.

6. The combination of claim 5 wherein the monitoring device is an active electronic monitoring device.

7. The combination of claim 6 wherein the active electronic monitoring device includes a microprocessor, a pressure sensor, and a battery.

8. The combination of claim 5 wherein the bottom surface of the encapsulated monitoring device is textured to increase the surface area.

9. The combination of claim 1 wherein the inner surface of the innerliner at which the monitoring device is adhered to is roughened.

10. The combination of claim 9 wherein the adhesive rigidly bonds to the roughened surface of the innerliner allowing the innerliner to flex without breaking the bond of the adhesive.

11. The combination of claim 10 wherein the monitoring device is located at a low flex area of the pneumatic device.

12. The combination of claim 11 wherein the innerliner is at least 1/8 inch thick.

13. In combination, a pneumatic tire and a monitoring device adapted to monitor at least one engineering condition of the pneumatic tire when the pneumatic tire is in use on a vehicle; the combination comprising:

a pneumatic tire having an inner chamber;

the pneumatic tire having an innerliner defining the inner surface of the pneumatic tire;

the innerliner being at least 0.06 inch thick;

a monitoring device having at least one sensing element adapted to monitor an engineering condition of the pneumatic tire;

the monitoring device having an outer surface;

an adhesive compatible with the innerliner and the outer surface of the monitoring device;

the adhesive being rigid when cured; and the rigid cured adhesive disposed between the monitoring device and the innerliner to connect the monitoring device to the pneumatic tire.

14. The combination of claim 13, wherein the pneumatic tire is an off-the-road truck or bus tire.

15. The combination of claim 13, wherein the adhesive is an amine-cured epoxy.

16. The combination of claim 15, wherein the adhesive includes epoxy and amine-curative having a ratio of 2.5 parts epoxy to one part amine-curative.

17. In combination, a pneumatic tire and a monitoring device adapted to monitor at least one engineering condition of the pneumatic tire when the pneumatic tire is in use on a vehicle; the combination comprising:

a pneumatic tire having an inner chamber;

the pneumatic tire having an innerliner defining the inner surface of the pneumatic tire;

the innerliner being at least 0.06 inch thick;

a monitoring device having at least one sensing element adapted to monitor an engineering condition of the pneumatic tire;

an adhesive compatible with the innerliner;

the adhesive being rigid when cured;

the monitoring device being encapsulated with a rigid epoxy to provide an encapsulated monitoring device having an outer surface; and the rigid cured adhesive disposed between the encapsulated monitoring device and the innerliner to connect the encapsulated monitoring device to the pneumatic tire.

18. The combination of claim 17, wherein the adhesive bonds to the rigid encapsulated monitoring device.

19. The combination of claim 17, wherein the pneumatic tire has low flex areas; the monitoring device being connected to the tire at one of the low flex areas of the tire.

* * * * *